Patented Feb. 15, 1944

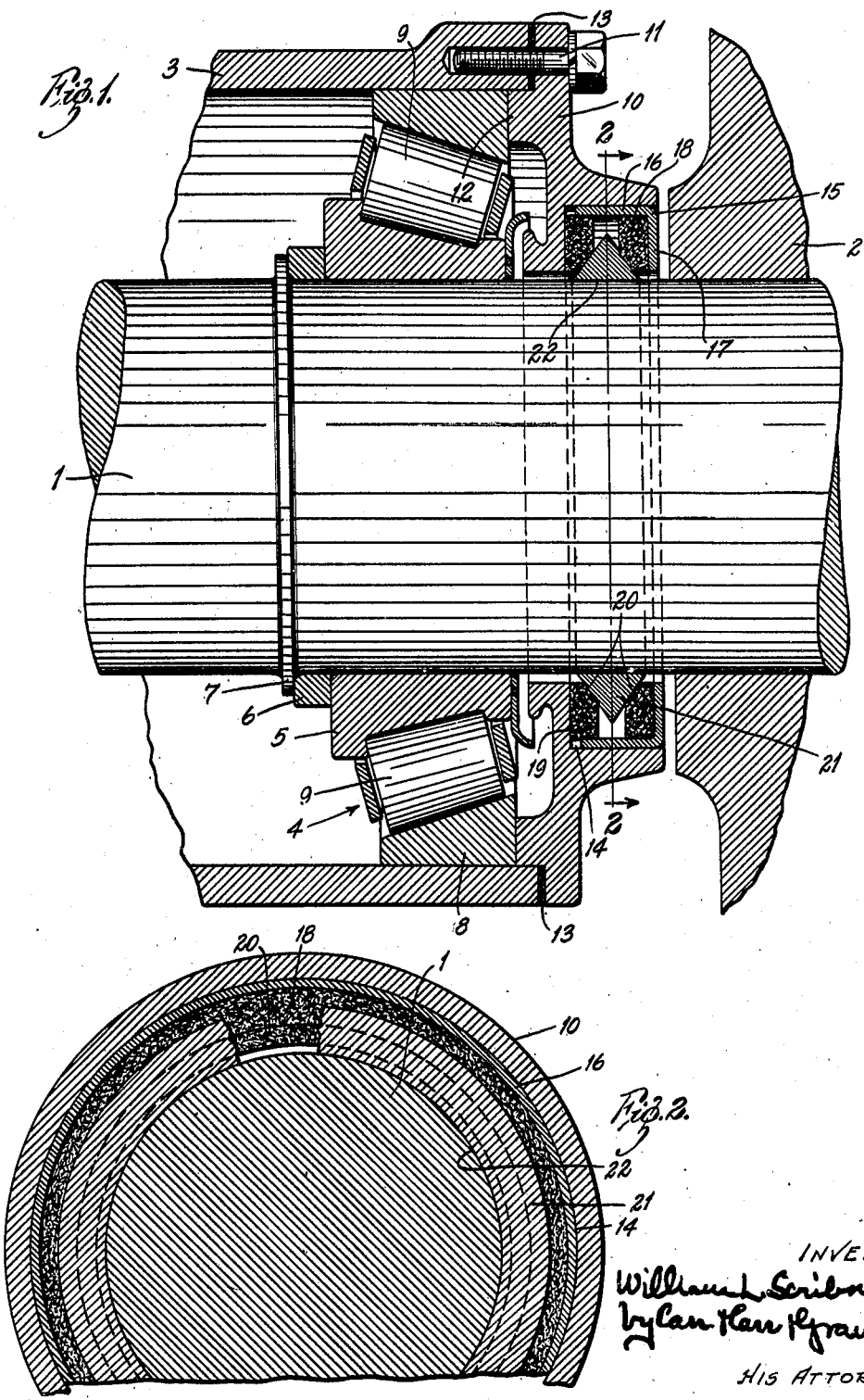

2,342,092

UNITED STATES PATENT OFFICE 2,342,092

AXLE BEARING SEAL

William L. Scribner, Canton, Ohio, assignor to The Timken Roller Bearing Company, Canton, Ohio, a corporation of Ohio Application May 18, 1942, Serial No. 443,352

4 Claims. (Cl. 288—3)

My invention relates to axle bearing seals, particularly to seals for railway car axle and the like bearings of the type having a sealing ring encircling the axle, wherein a close fitting sealing ring is desirable, but wherein a loose fit is commonly provided by reason of the necessity for accommodating lateral play of the axle and wear of the bearing. The invention has for its principal objects to accommodate such lateral play of the axle and wear in the bearings, while maintaining a close sealing fit between the sealing ring and the axle and providing a simple, durable and inexpensive construction. Another object is a pre-assembled unit-handled sealing device for mounting in an axle housing. Other objects and advantages will appear hereinafter.

The invention consists principally in a rigid sealing ring and spaced resilient supporting rings therefor mounted in a carrier ring of angular section. The invention further consists in the axle bearing seal and in the parts and combinations and arrangements of parts hereinafter described and claimed.

In the accompanying drawing,

Fig. 1 is a longitudinal sectional view of a railway car axle bearing seal embodying my invention; and Fig. 2 is a transverse sectional view on the line 2—2 in Fig. 1.

In the accompanying drawing is shown an end portion of a railway vehicle axle 1 having a wheel 2 on the end thereof, an axle housing 3 terminating adjacent to the face of the wheel 2 and a taper roller bearing 4 interposed between the axle 1 and the end of said housing 2.

The cone 5 or inner bearing member of said bearing is mounted against an abutment ring 6 that is seated against a shoulder 7 on the axle, with its small end facing the wheel 2. The cup 8 or outer bearing member is mounted in the end portion of the housing 3 and tapered bearing rollers 9 are interposed between said cup 8 and said cone 5. An end plate 10 secured to the end of the housing, as by screws 11, has an inwardly extending annular rib 12 which bears against the end of said bearing cup 8. Bearing adjustment is obtained by means of shims 13 interposed between the housing 3 and said end plate 10.

Said end plate has a cylindrical recess or pocket 14 therein facing the wheel 2 and a mounting or carrier ring 15 of angular section has its peripheral sleeve portion 16 pressed in said pocket 14. Mounted in said carrier ring 15 against the radial end or washer portion 17 of said carrier ring is a ring 18 of yieldable or resilient material and mounted in the end of said sleeve 16 of said carrier ring 15 remote from said washer portion 17 is a second similar ring 19 of yieldable or resilient material, said rings 18 and 19 having their opposed inner peripheral portions 20 beveled. Interposed between said yieldable rings 18 and 19 is a rigid sealing ring 21 of substantially triangular section, two sides of said ring being engaged by said beveled portions of said yieldable ring and the bore 22 of said sealing ring making a close sealing fit with said axle 1, but permitting rotary and axial movement of the axle therein. Said sealing ring 21 may be made of metal, micarta or other suitable material.

The yieldable ring 19 in the open end of the carrier ring 15 projects therefrom and the yieldable rings 18 and 19 may be compressed as desired, by regulating the distance that the carrier ring 15 is pressed into the socket 14 in the end plate 10. The sealing ring 21 maintains a close sealing fit with the axle, being free to yield with the axle to accommodate lateral play thereof or looseness in the bearing due to wear or other cause. The yieldable rings 18 and 19 form an additional sealing device preventing by-passing of oil or foreign matter around the sealing ring. The sealing device may be preassembled and mounted as a unit in the end plate of the housing. Obviously the sealing device is compact, simple, durable and economical, as well as constituting an efficient closure that maintains its tight sealing engagement with the axle, regardless of lateral play in the axle. Obviously the invention is not limited to the details of bearing, axle and housing construction shown in the drawing and numerous changes may be made without departing from the invention so that I do not wish to be limited to the precise construction shown.

What I claim is:

1. A preassembled, unit handled axle bearing seal for wheeled axles and the like comprising a pair of spaced rings of yieldable material, a carrier ring therefor and a continuous sealing ring for said axle held between said yieldable rings.

2. A preassembled, unit handled axle bearing seal for wheeled axles and the like comprising a pair of spaced rings of yieldable material, a carrier ring therefor and a continuous sealing ring for said axle held between said yieldable rings, said yieldable rings having beveled inner peripheral portions engaging the sides of said sealing ring.

3. An axle bearing seal for wheeled axles and the like comprising a ring of angular section having a sleeve portion adapted to be mounted in a housing and a radial washer portion, a ring of yieldable material mounted in said angular supporting ring against the inner face of said washer portion, a ring of yieldable material mounted in said angular ring, spaced from said first yieldable ring, the opposed inner peripheral edges of said yieldable rings being beveled and a continuous rigid sealing ring of triangular section supported by engagement with the beveled portions of said yieldable rings, said sealing ring having a bore such as to have a running fit on said axle.

4. A preassembled, unit handled axle bearing seal for wheeled axles and the like comprising a ring of angular section having a sleeve portion adapted to be mounted in a housing and a radial washer portion, a ring of yieldable material mounted in said angular supporting ring against the inner face of said washer portion, a ring of yieldable material mounted in said angular ring, spaced from said first yieldable ring and projecting beyond the end of said angular ring remote from said washer portion, whereby said yieldable ring may be compressed by engagement of said projecting ring with a seal in said housing, the opposed inner peripheral edges of said yieldable rings being beveled and a continuous rigid sealing ring of triangular section supported by engagement with the beveled portions of said yieldable rings, said sealing ring having a bore such as to have a running fit on said axle.

WILLIAM L. SCRIBNER.